(12) United States Patent
Wen

(10) Patent No.: US 8,002,346 B2
(45) Date of Patent: Aug. 23, 2011

(54) BICYCLE SEAT FRAME

(76) Inventor: Chester Wen, Chang Hua Hsien (TW)

( * ) Notice: Subject to any disclaimer, the term of this patent is extended or adjusted under 35 U.S.C. 154(b) by 142 days.

(21) Appl. No.: 12/574,706

(22) Filed: Oct. 7, 2009

(65) Prior Publication Data

US 2010/0123339 A1    May 20, 2010

(30) Foreign Application Priority Data

Nov. 20, 2008    (TW) ................................ 97144857 A

(51) Int. Cl.
*B62J 1/00*    (2006.01)
*B62J 1/02*    (2006.01)
(52) U.S. Cl. ........................................ 297/201; 297/202
(58) Field of Classification Search .................. 297/201, 297/202
See application file for complete search history.

(56) References Cited

U.S. PATENT DOCUMENTS

| 3,997,214 | A | * | 12/1976 | Jacobs ...................... 297/202 X |
| 5,863,094 | A | * | 1/1999 | Endo .............................. 297/201 |
| 6,095,600 | A | * | 8/2000 | Mattingly ...................... 297/201 |
| 2009/0309396 | A1 | * | 12/2009 | Arnold et al. .................. 297/201 |

* cited by examiner

*Primary Examiner* — Rodney B White

(57) ABSTRACT

A bicycle seat frame includes a front unit, a middle unit and a rear unit, each unit includes two pads located on two sides of the seat frame and multiple connection members are respectively connected between the pads of the front unit, the middle unit and the rear unit on the two sides of the bicycle seat frame. Gaps are defined between the front unit, the middle unit and the rear unit. Two rods are connected between the front unit and the rear unit and connected to the seat post. The connection members are flexible so as to absorb the shocks.

3 Claims, 6 Drawing Sheets

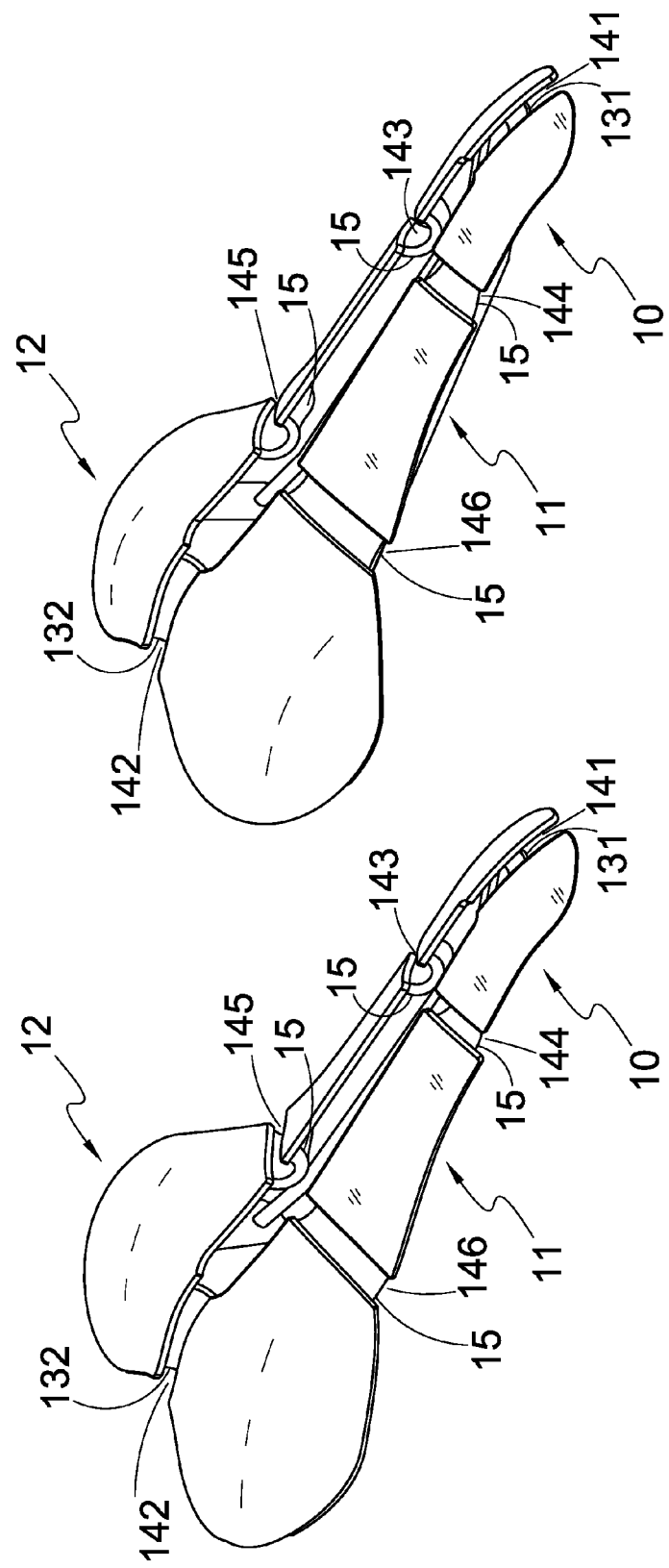

BICYCLE SEAT FRAME

BACKGROUND OF THE INVENTION

1. Field of the Invention

The present invention relates to a bicycle seat frame, and more particularly to a bicycle seat frame which is deformable to absorb shocks.

2. Description of Related Art

A conventional bicycle seat is designed to support the weight of the cyclist and a good bicycle seat can relieve the pressure applied to the hip of the cyclist so as to reduce uncomfortable feeling during long distance cycling. A latest bicycle seat known to applicant includes a main part with two substantially parallel rods connected thereto and two seat portions are respectively connected on the two rods. Each seat portion is connected with a hydraulic cylinder which is located beneath the seat portion. The seat portions are lightly up and down to activate the hydraulic cylinders to absorb the shocks.

Nevertheless, the bicycle seat includes a main part, two rods, two seat portions and two hydraulic cylinders, the multiple number results in high cost of manufacturing and the weight of the bicycle seat is significantly increased, which are not suitable for requirements of most of the bicycles in the market. The hydraulic cylinders have to be maintained and/or replaced with new parts, this is inconvenient for most of the cyclists.

The present invention intends to provide a bicycle seat frame which is light in weight and can provide satisfied shock-absorbing feature.

SUMMARY OF THE INVENTION

The present invention relates to a bicycle seat frame which comprises a front unit, a middle unit and a rear unit. Multiple first connection members are respectively connected between the front unit, the middle unit and the rear unit on each of two sides of the bicycle seat frame. Gaps defined between the front unit, the middle unit and rear unit.

The front unit includes a first front pad and a second front pad, the middle unit includes a first middle pad and a second middle pad, the rear unit includes a first rear pad and a second rear pad. At least one second connection member is connected between the first front pad and the second front pad, and between the first middle pad and the second middle pad.

The primary object of the present invention is to provide a bicycle seat frame which includes gaps between the front unit, middle unit and the rear unit, the gaps are slightly deformed when the shocks are transferred to the seat frame.

Another object of the present invention is to provide a bicycle seat frame which includes gaps between the front unit, middle unit and the rear unit, the gaps are slightly deformed when the shocks are transferred to the seat frame.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIGS. 6 and 7 show the bicycle seat frame of the present invention when shocks or pressure are transferred thereto.

DETAILED DESCRIPTION OF THE INVENTION

Figure 1:
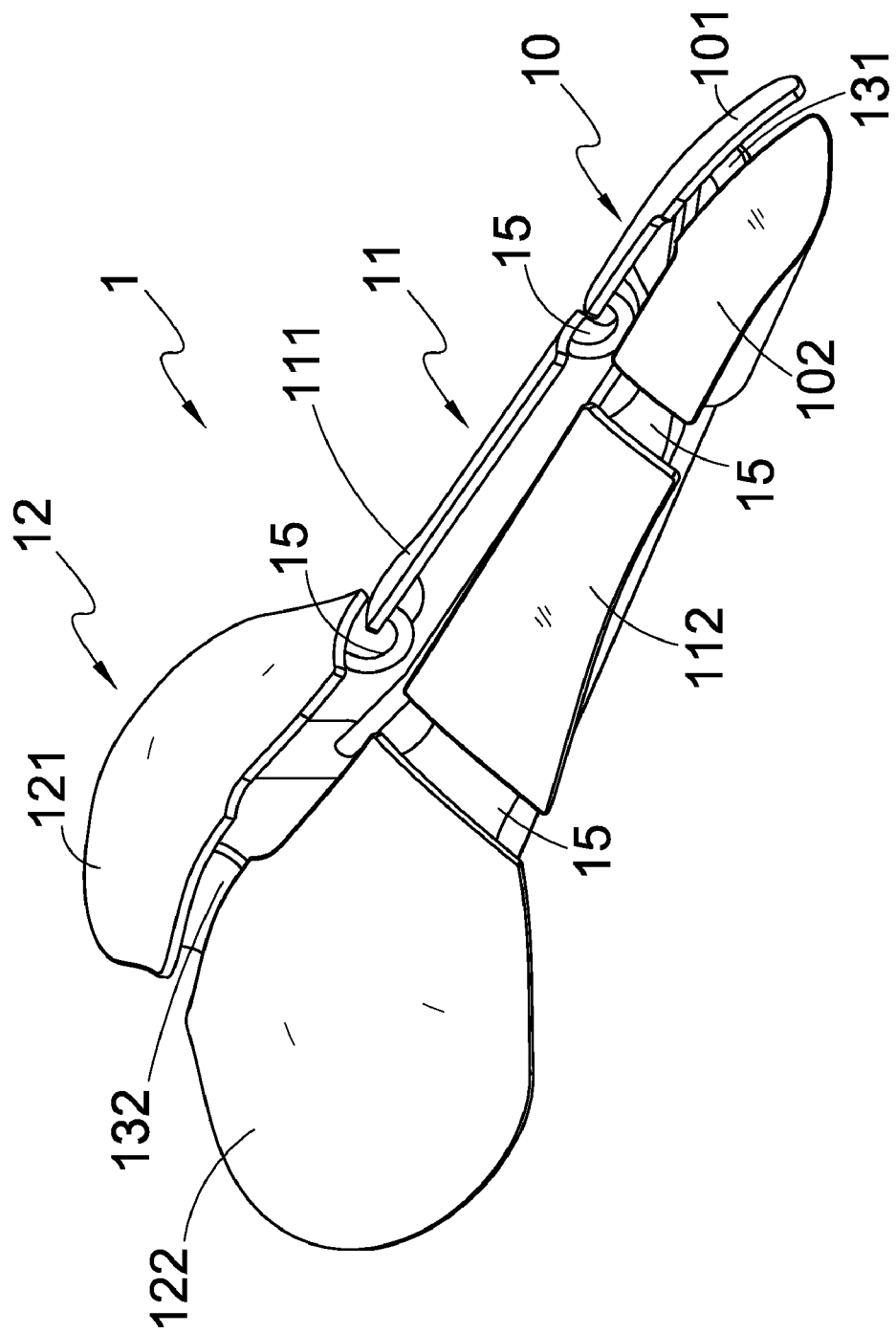
FIG. 1 is a perspective view to show the bicycle seat frame of the present invention.
Figure 2:
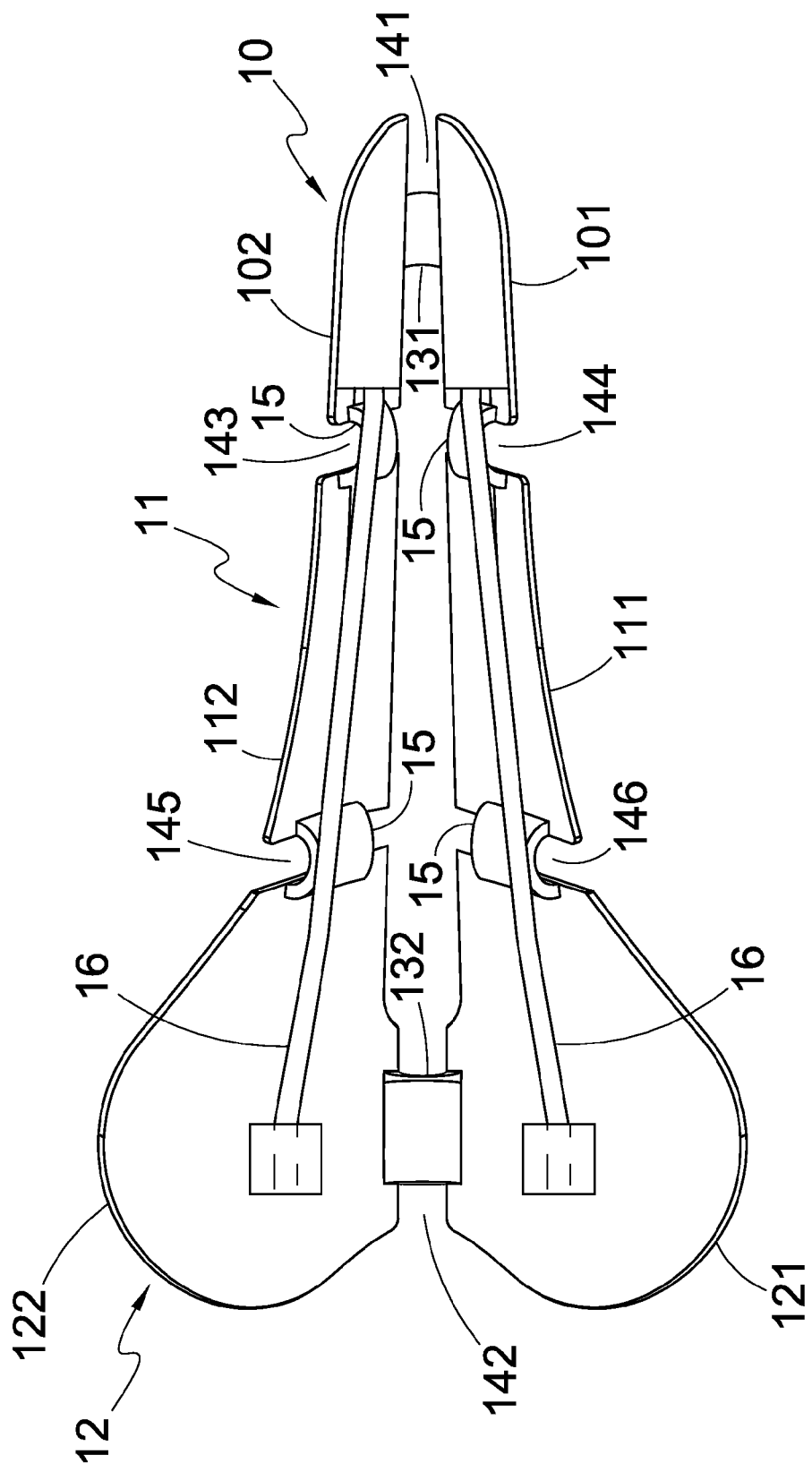
FIG. 2 is a bottom view of the bicycle seat frame of the present invention.
Figure 3:
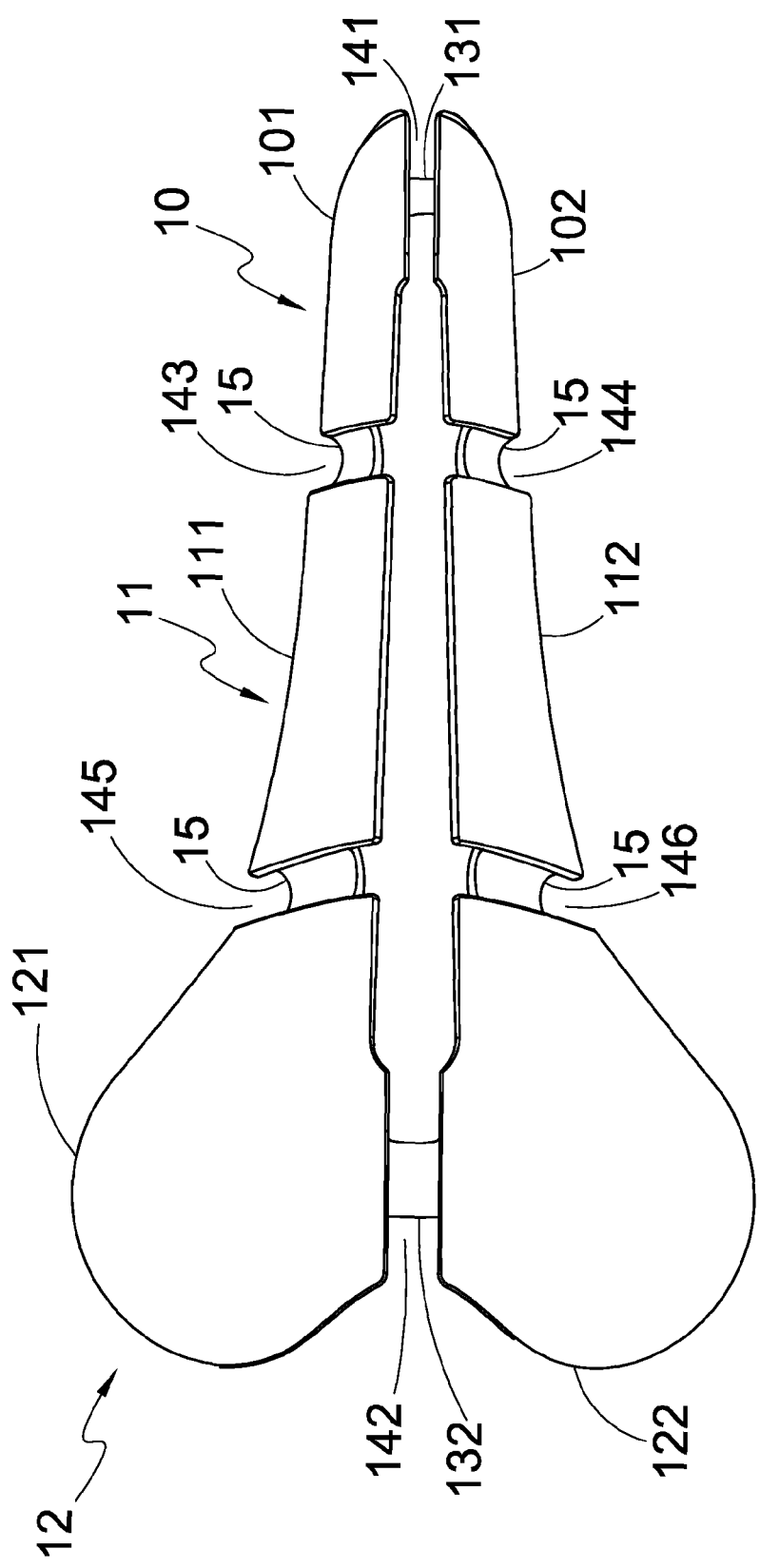
FIG. 3 is a top view of the bicycle seat frame of the present invention.
Figure 4:
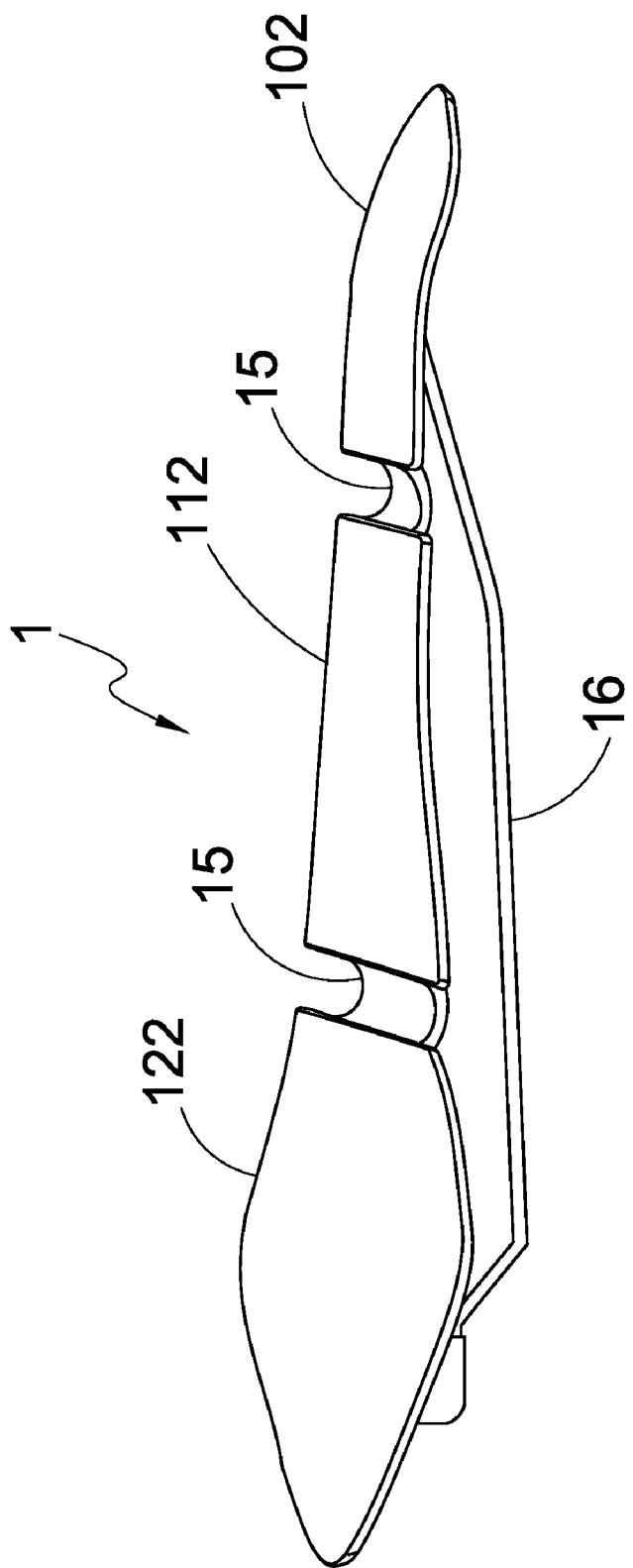
FIG. 4 is a side view of the bicycle seat frame of the present invention.
Figure 5:
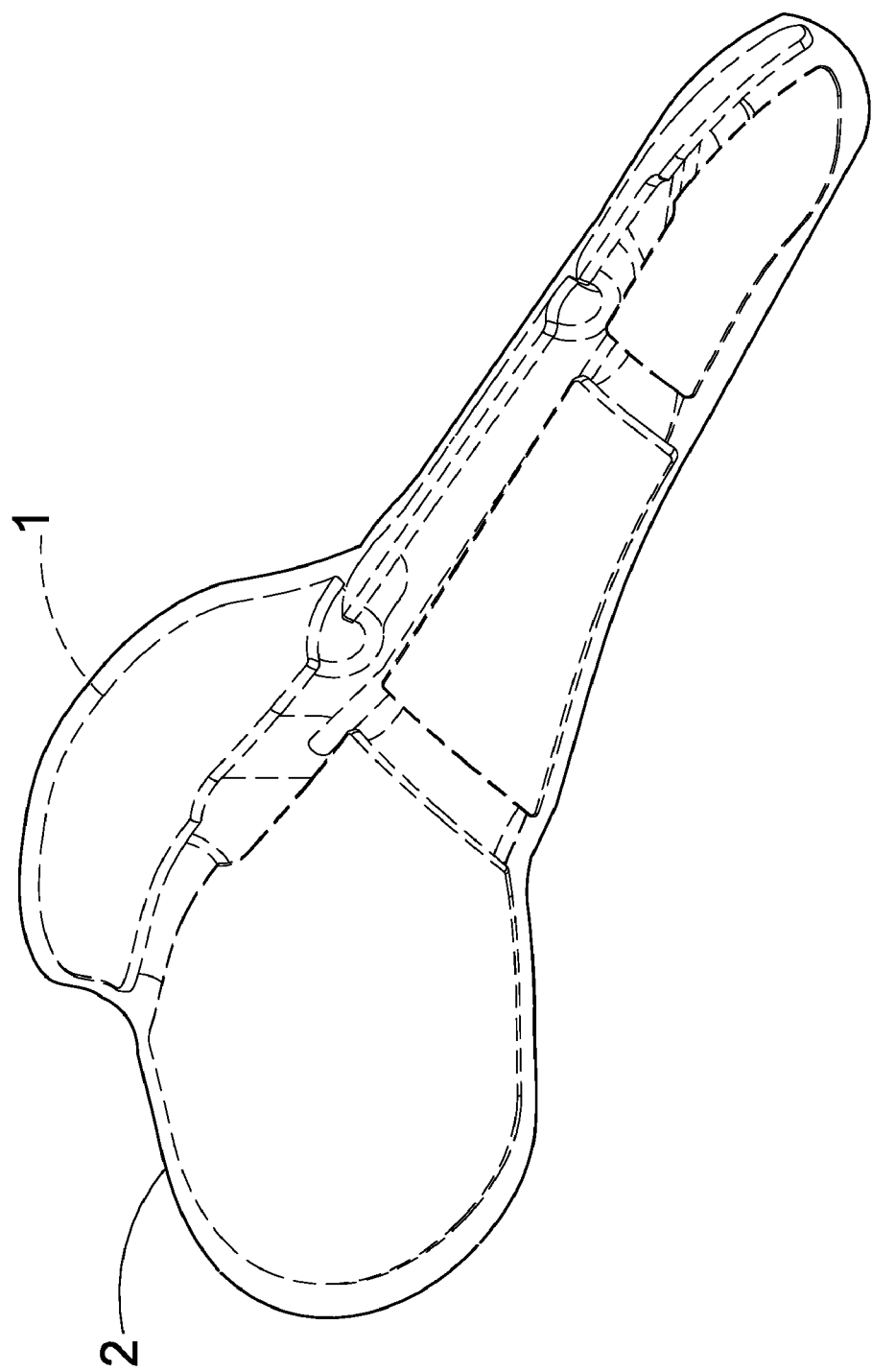
FIG. 5 shows an outer layer is mounted to the bicycle seat frame of the present invention.

Referring to FIGS. 1 to 5, the bicycle seat frame 1 of the present invention comprises a front unit 10, a middle unit 11 and a rear unit 12. The front unit 10 includes a first front pad 101 and a second front pad 102. The middle unit 11 includes a first middle pad 111 and a second middle pad 112. The rear unit 12 includes a first rear pad 121 and a second rear pad 122. The first front pad 101, the first middle pad 111 and first rear pad 121 are located on one side of the seat frame 1. The second front pad 102, the second middle pad 112 and second rear pad 122 are located on the other side of the seat frame 1.

Multiple first connection members 15 are elastic and respectively connected between the front unit 10, the middle unit 11 and the rear unit 12 on each of two sides of the bicycle seat frame 1. Each of the first connection members 15 is in an arc shape. In this embodiment, one first connection member 15 is connected between the first front pad 101 and the first middle pad 111. One first connection member 15 is connected between the first middle pad 111 and the first rear pad 121. One first connection member 15 is connected between the second front pad 102 and the second middle pad 112. One first connection member 15 is connected between the second middle pad 112 and the second rear pad 122.

Two gaps 144, 143 are respectively defined between the first front pads 101 and the first middle pad 111 and between the second front pad 102 and the second middle pad 112 in the two sides of the bicycle seat frame 1. Two gaps 146, 145 are respectively defined between the first middle pad 111 and the first rear pad 121 and between the second middle pad 112 and the second rear pad 122 in the two sides of the bicycle seat frame 1.

A second connection member 131 is connected between the first front pad 101 and the second front pad 102, and another second connection member 132 is connected between the first rear pad 121 and the second rear pad 122. Each of the second connection members 131, 132 is an arc-shaped member. The two second connection members 131, 132 are elastic. A gap 141 is defined between the first and the second front pads 101, 102, and another gap 142 is defined between the first and the second rear pads 121, 122.

Two connection rods 16 are respectively connected between the first front pad 101 and the first rear pad 121, and between the second front pad 102 and the second rear pad 122. The two connection rods 16 are connected to a connector on the seat post (not shown). An outer layer 2, such as a gel pad or sponge pad, covers the bicycle seat frame 1 so as to provide comfortable cycling experience.

Referring to FIGS. 6 and 7, when the bicycle seat frame 1 is applied by shocks or pressure, the first and second connection members 15, 131, 132 are slightly deformed and the widths of the gaps 141, 142, 143, 144, 145, 146 are changed to absorb the shocks and pressure. By this way, only a small portion of the shocks is transferred to the cyclists.

While we have shown and described the embodiment in accordance with the present invention, it should be clear to those skilled in the art that further embodiments may be made without departing from the scope of the present invention.

What is claimed is:

1. A bicycle seat frame comprising:

a front unit, a middle unit and a rear unit, multiple first connection members respectively connected between the front unit, the middle unit and the rear unit on each of two sides of the bicycle seat frame, two gaps defined between the front unit and the middle unit in the two sides of the bicycle seat frame, two gaps defined between the middle unit and the rear unit in the two sides of the bicycle seat frame;

the front unit including a first front pad and a second front pad, the middle unit including a first middle pad and a second middle pad, the rear unit including a first rear pad and a second rear pad, a second connection member connected between the first front pad and the second front pad, the second connection member being elastic, a gap defined between the first front pad and the second front pad;

a second connection member connected between the first rear pad and the second rear pad, the second connection member being elastic, a gap defined between the first rear pad and the second rear pad;

wherein the bicycle seat frame is lightened and is able to slightly deform for absorbing vibrations and shocks.

2. The bicycle seat frame as claimed in claim 1, wherein each of the first connection members is an arc-shaped member.

3. The bicycle seat frame as claimed in claim 1, wherein the second connection member is an arc-shaped member.

* * * * *